US008340363B2

(12) United States Patent
Sarkar et al.

(10) Patent No.: US 8,340,363 B2
(45) Date of Patent: Dec. 25, 2012

(54) SYSTEM AND METHOD FOR EFFICIENT INTERPRETATION OF IMAGES IN TERMS OF OBJECTS AND THEIR PARTS

(75) Inventors: Prateek Sarkar, Sunnyvale, CA (US); Evgeniy Bart, Sunnyvale, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 420 days.

(21) Appl. No.: 12/788,852

(22) Filed: May 27, 2010

(65) Prior Publication Data

US 2011/0293187 A1 Dec. 1, 2011

(51) Int. Cl.
*G06K 9/00* (2006.01)

(52) U.S. Cl. ....................................... 382/115; 382/226

(58) Field of Classification Search .................. 382/115, 382/226

See application file for complete search history.

(56) References Cited

U.S. PATENT DOCUMENTS

| | | | | |
|---|---|---|---|---|
| 4,630,308 | A | 12/1986 | Hongo | |
| 5,767,978 | A | 6/1998 | Revankar et al. | |
| 5,900,953 | A | 5/1999 | Bottou et al. | |
| 6,633,670 | B1 | 10/2003 | Matthews | |
| 6,678,415 | B1 * | 1/2004 | Popat et al. | 382/226 |
| 6,731,800 | B1 | 5/2004 | Barthel et al. | |
| 6,766,053 | B2 | 7/2004 | Fan et al. | |
| 6,891,969 | B2 | 5/2005 | Revill | |
| 6,973,213 | B2 | 12/2005 | Fan et al. | |
| 6,983,068 | B2 | 1/2006 | Prabhakar et al. | |
| 7,224,836 | B2 | 5/2007 | Sarkar | |
| 7,366,357 | B2 | 4/2008 | Curry et al. | |
| 7,376,272 | B2 | 5/2008 | Fan et al. | |
| 7,379,593 | B2 | 5/2008 | Fan et al. | |
| 7,379,594 | B2 | 5/2008 | Ferman et al. | |
| 7,386,167 | B2 | 6/2008 | Imamura | |
| 7,395,253 | B2 * | 7/2008 | Mangasarian et al. | 706/46 |
| 7,403,661 | B2 | 7/2008 | Curry et al. | |
| 7,433,535 | B2 | 10/2008 | Mukherjee | |
| 7,489,830 | B2 | 2/2009 | Bloomberg et al. | |
| 2002/0051145 | A1 | 5/2002 | Watanabe et al. | |
| 2002/0064313 | A1 | 5/2002 | Cheng | |
| 2002/0146166 | A1 | 10/2002 | Rao et al. | |

(Continued)

OTHER PUBLICATIONS

Jerorsky, et al., "Robust Face Detection Using the Hausdorff Distance", In Proc. 3rd Int'l Conf. on Audio- and Video-based Biometric Person Authentication, Springer, Lecture Notes in Computer Science, LNCS-2091, pp. 90-95, Halmstad, Sweden, Jun. 6-8, 2001.

(Continued)

*Primary Examiner* — Hadi Akhavannik

(74) *Attorney, Agent, or Firm* — Fay Sharpe LLP

(57) ABSTRACT

The present application is a method and system of interpreting an image by finding a configuration of multiple variables which optimizes an objective function with a factorizable upper bound, by applying an iterative algorithm that relies on efficient dynamic ordering of candidate configurations, in a priority queue, in a descending order of an upper bound score. As an example, consider a constellation model for an object. It specifies the appearance models for individual parts of objects, as well as spatial relations among these parts. These are combined into a single function whose value represents the likeness of the object in an image. To find the configuration in which the object is present in the image, we maximize this function over all candidate configurations. The purpose of the iterative algorithm mentioned above is to find such optimal configurations efficiently.

20 Claims, 9 Drawing Sheets

U.S. PATENT DOCUMENTS

| | | | | |
|---|---|---|---|---|
| 2002/0146167 | A1 | 10/2002 | Imamura et al. | |
| 2002/0176622 | A1 | 11/2002 | Watanabe et al. | |
| 2003/0081836 | A1 | 5/2003 | Averbuch et al. | |
| 2003/0093393 | A1* | 5/2003 | Mangasarian et al. | 706/16 |
| 2004/0227758 | A1 | 11/2004 | Curry et al. | |
| 2005/0180642 | A1 | 8/2005 | Curry et al. | |
| 2005/0271274 | A1 | 12/2005 | Urano et al. | |
| 2005/0286776 | A1 | 12/2005 | Bai et al. | |
| 2006/0159370 | A1 | 7/2006 | Tanaka et al. | |
| 2006/0221205 | A1 | 10/2006 | Nakajima et al. | |
| 2007/0014460 | A1 | 1/2007 | Kuziela et al. | |
| 2007/0140571 | A1 | 6/2007 | Fan et al. | |
| 2007/0257939 | A1 | 11/2007 | Fan | |
| 2008/0050023 | A1 | 2/2008 | Feng et al. | |
| 2008/0271274 | A1 | 11/2008 | Kordic et al. | |
| 2009/0067709 | A1 | 3/2009 | Gross et al. | |

OTHER PUBLICATIONS

Zilberstein, Shlomo, "Using Anytime Algorithms in Intelligent Systems", Copyright 1996, AI Magazine, vol. 17, No. 3, 11 pgs.
Crandal, et al., "Spatial Priors for Part-Based Recognition Using Statistical Models", in CVPR, 2005, 8 pgs.
Daume III, "Fast Search for Direchlet Process Mixture Models", in Proceedings fo 11th Int'l Conf. on Artificial Intelligence and Statistics, 2007.
Lowe, "Distinctive Image Features from Scale-Invaiant Keypoints", Int'l Journal of Computer Vision, 2004.
Fergus, "Visual Object Category Recognition", Robotics Research Group, Dept. of Eng. Science, University of Oxford, 2005 (includes 2 files, pp. 1-100 and pp. 101-185).
Fergus, "Object Class Recognition by Unsupervised Scale-Invariant Learning", in CVPR, Jun. 2003.
Fei-Fei et al., "Learning Generative Visual Models from Few Training Examples: An Incremental Bayesian Approach Tested on 101 Object Categories", in CPVR 2004 Workshop on Generative-Model Based Vision, 2004.
Fei-Fei et al., "A Bayesian Hierarchical Model for Learning Natural Scene Categories", in CVPR, 2005.
Mikolajczyk et al., "A Comparison of Affine Region Detectors", IJCV, 65(1/2):43-72, 2005.
Dryden et al., "General Shape Distribution in a Plane", Advances in Applied Probability, 23(2):259-276, 1991.
Leung et al., "Finding Faces in Cluttered Scenes using Random Labeled Graph Matching", in ICCV, 1995.
Burl, et al., "A Probabilistic Approach to Object Recognition Using Local Photometry and Global Geometry", Lecture Notes in Computer Science, 1407:628-641, 1998.
Burl et al., "Recognition of Planar Object Classes", in CVPR, pp. 223-230, 1996.
Moreels, "Recognition by Probabilistic Hypotheses Construction", in ECCV, pp. 55-68, 2004.
Weber et al., "Towards Automatic Discovery of Object Categories", IN cvpr, pp. 101-109, 2000.
Weber et al., "Unsupervised Learning of Models for Recognition", in ECCV, pp. 18-32, 2000.
Sarkar, "An Iterative Algorithm for Optimal Style Conscious Field Classification", in ICPR, 2002; also, IEEE Xplore, current version Jul. 9, 2003.
Applying the Haar Wavelet Transform to Time Series Information, Internet download at http://www.bearcave.com/misl/misl_tech/wavelets/haar.html, 15 pages, Feb. 2004.
Guo et al., "A Survey of Algorithms for Real-Time Bayesian Network Inference", Laboratory for Knowledge Discovery in Databases, Department of Computing and Information Sciences, Kansas State University, AAAI Technical Report WS-02-15, Compilation copyright 2002, 8 pages.
Crandall, "Part-Based Statistical Models for Visual Object Class Recognition", Dissertation, Cornell University, Aug. 2008, 158 pages.
Pinz, "Object Categorization", Foundations and Trends in Computer Graphics and Vision, 2006, pp. 255-353, vol. 1, No. 4 (2 separate files uploaded).

* cited by examiner

| DATA SET, MODEL | OUR METHOD | STAR | 2-FAN | FULL SEARCH |
|---|---|---|---|---|
| 810 BioID FACES, 6 PARTS | 6.0e+5 | 5.0e+5 | 4.2e+8 | 3.8e+17 |
| 820 BioID FACES, 10 PARTS | 2.6e+6 | 5.0e+5 | 4.2e+8 | 5.8e+29 |
| 830 BioID FACES, 14 PARTS | 3.3e+6 | 5.0e+5 | 4.2e+8 | 4.4e+41 |
| BioID FACES, 6 PARTS (SYMMETRY PRIOR) | 1.4e+6 | 5.0e+5 | 4.2e+8 | 3.8e+17 |
| MOTORBIKES, 6 PARTS | 5.3e+4 | 1.8e+4 | 2.8e+6 | 1.5e+13 |
| CAR SIDES, 6 PARTS | 4.4 | 6.0e+4 | 1.5e+7 | 5.8e+21 |

SYSTEM AND METHOD FOR EFFICIENT INTERPRETATION OF IMAGES IN TERMS OF OBJECTS AND THEIR PARTS

BACKGROUND

The present application relates to the interpretation of images, and more particularly to solving issues of image interpretation related to:

Localization: The finding of a specific known object or any object of a specific known category in the image and locating the individual parts of the object. Here, an object may be a shape (such as a company logo), or a natural object such as a car or a face.

Detection: The testing of whether or not an image contains a specific known object or any object of a specific known category.

Categorization: The assigning of category labels to images based on their content.

INTRODUCTION

Part-based models of object or scene categories are well known in the art. However, while models, such as related 'bag-of-features' models, have been used successfully for image tagging and categorization, it has long been recognized that spatial relations between object features are an essential part of object representation. Modeling spatial relations improves performance of object recognition, categorization, and localization. Models with spatial relations can also be used for automatic image interpretation in terms of objects and their parts. This latter problem—efficient localization of object parts is of interest in its own right. This is because some object parts, such as the eyes, are so important that they can be considered objects of intrinsic interest.

Modeling spatial relations introduces dependencies among the model variables. This makes using such models computationally challenging, because the objective function has to be maximized jointly over multiple variables. For example, consider constellation models—a well-known family of models that incorporate both part appearance and spatial relations. Briefly, the model consists of a set K parts with characteristic appearance. For example, for the category of faces the parts could be the eyes, nose, and mouth. A complete face is then detected by localizing the individual parts.

If parts of an object are independent and each part had N candidate locations in an image, the best location for each part can be found by evaluating 'goodness' of N candidate configurations, for a total of KN evaluations to detect an object. However, modeling parts as independent results in poor localization.

To improve localization of individual parts, it is useful to model information about their typical spatial arrangement. Modeling such geometric information greatly improves localization performance. But it also introduces dependencies among parts. For example, for the case of faces, the information that could be modeled is the symmetry of the face or the typical inter-part distances. But with this model, positing a certain location for the eye part affects the set of locations where the nose is likely to be found. As a result, parts can no longer be fit to the image independently. Instead, an optimal configuration needs to be searched over the $N^K$ possible joint locations of all parts. Since this is exponential in K, the search quickly becomes intractable as the number of parts increases. In particular, modeling spatial relations among seven parts has often been considered a practical limit.

It is therefore desirable to find new methods of optimizing models with dependencies among parts.

BRIEF DESCRIPTION

The present application is a method and system of interpreting an image by finding a configuration of multiple variables which optimizes an objective function with a factorizable upper bound, by applying an iterative algorithm that relies on efficient dynamic ordering of candidate configurations, in a priority queue, in a descending order of an upper bound score. As an example, consider a constellation model for an object. It specifies the appearance models for individual parts of objects, as well as spatial relations among these parts. These are combined into a single function whose value represents the likeness of the object in an image. To find the configuration in which the object is present in the image, we maximize this function over all candidate configurations. The purpose of the iterative algorithm mentioned above is to find such optimal configurations efficiently.

DETAILED DESCRIPTION

Figure 1:
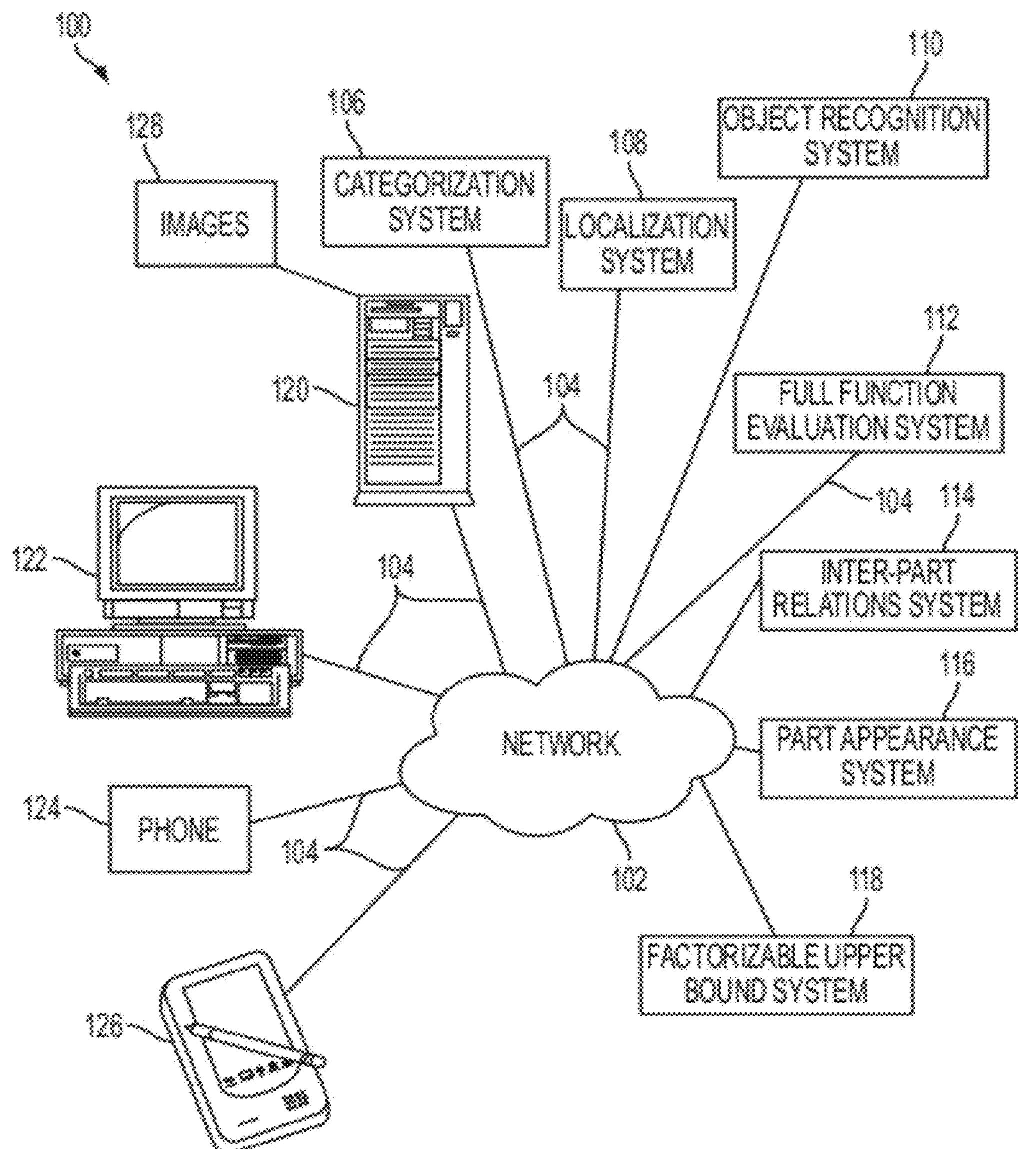
FIG. 1 is an overview of the computer implementation of the present image interpretation system and method.

FIG. 1 depicts an environment 100 in which concepts of the present application are implemented. Environment 100 provides for communication between a plurality of components via a network 102 and communication channels 104. The components in environment 100 include a categorization system 106, a localization system 108, an object recognition system 110, a full function evaluation system 112, an inter-part relations system 114, a part appearance system 116, and a factorizable upper bound system 118. Each of these systems may reside on a separate computer operable server with a separate processor and computer memory, and running appropriate software. They may also be attached as an element to a cloud computing environment, or be located on the same server such as server 120. Each server may be connected via the communications links 104 any of a variety of devices capable of receiving and transmitting images, such as but not limited to, a web-enabled computer 122, a phone (with image generating capability) 124, or other web-enabled portable device 126. Server 120 may also be considered an information repository comprised of computer memory that may be organized as a computer database, which contains electronically stored images 128. Alternatively, the entire system of the present application may be located on a standalone computing device. Images from devices 122-126 may transmit images to and receive images from systems 106-118 in such a manner as to accomplish the image interpretation operations to be described below, where various steps of these operations are accomplished by systems 106-118.

Figure 2:
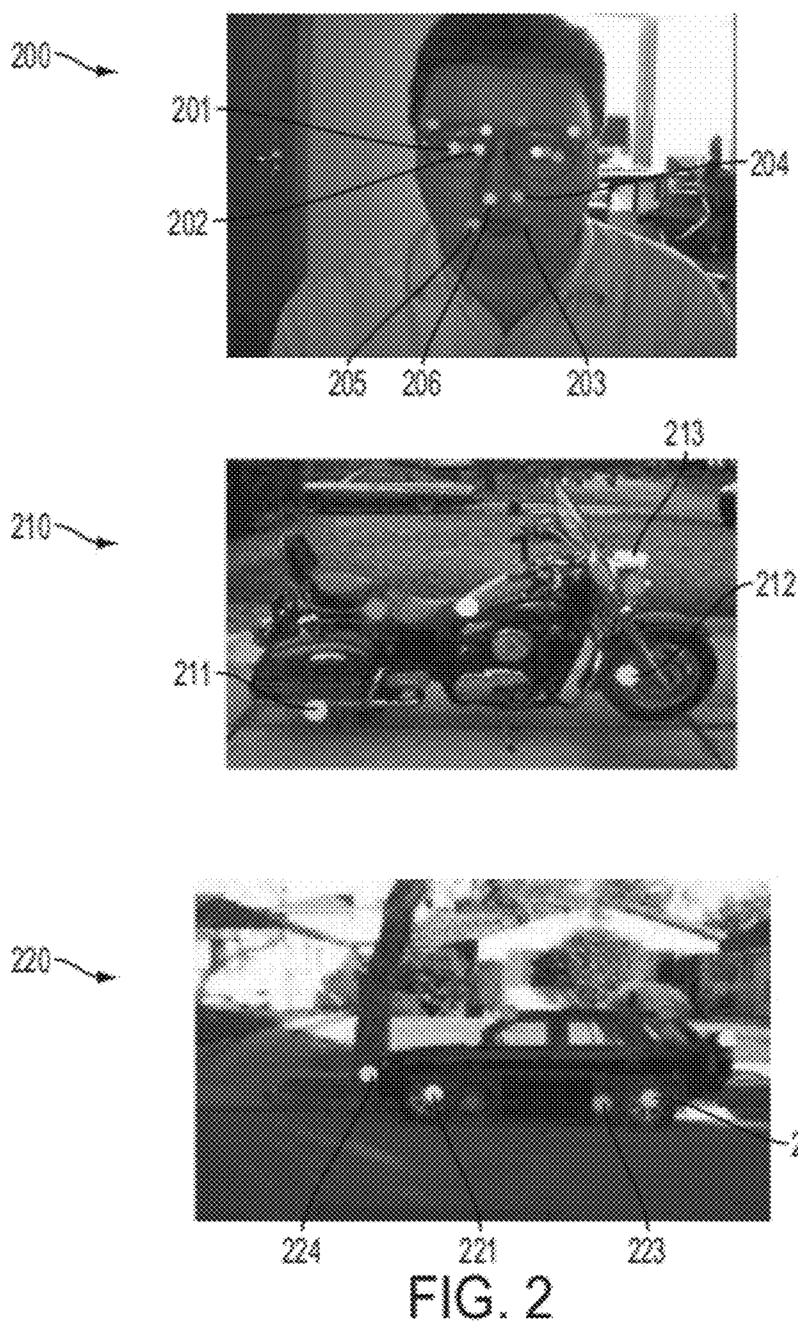
FIG. 2 is an example of an output using a constellation model.

Turning now to FIG. 2, illustrated are results of a process applying a constellation model to a face 200, a motorcycle 210, and an automobile 220. Constellation models are well known in the art of computer vision, and are probabilistic models for category-level object recognition in computer vision. Like other part-based models, the constellation model attempts to represent an object class by a set of K parts under mutual geometric constraints. Because the constellation model considers the geometric relationship between different parts, it explicitly models the relative location, relative scale, and appearance of these parts for a particular object category.

The constellation model contains two components: the appearance model and the spatial relations model. Nine examples of embodiments of the present application span three different appearance models and three different spatial priors.

While a constellation model has been emphasized, more generally an objective function other than one of the constellation model could be used, as long as it has a factorizable upper bound. As will be expanded upon in the following discussion, factorizable means that the upper bound is, or can be manipulated into the form of a sum of non-interacting parts or a product of non-negative interacting parts by some arithmetic or other operation.

Therefore, while part-based models of object or scene categories are popular in computer vision literature, and related 'bag-of-features' models have been used successfully for image tagging and categorization, it has long been recognized that spatial relations between object features are an essential part of object representation. Modeling spatial relations improves performance of object recognition, categorization, and localization. Models with spatial relations can also be used to invoke automatic image interpretation in terms of objects and their parts. This latter problem, efficient localization of object parts, is of interest in its own right because, as can be seen in FIG. 2, some object parts, such as the eyes 201, 202, nose 204, 206, and mouth 203, 205 are so important that they can be considered objects of intrinsic interest.

As an example, consider motorbikes (a particular motorbike being motorbike 210), which have many different shapes, sizes, and designs. The recognition of motorbikes in an image is hard. However, parts of a motorbike tend to have a more consistent appearance, such as wheels 211, 212 and headlight 213. One way to address motor-bike recognition is, then, to look for wheels 211, 212, headlights 213, and such parts in expected relative spatial relationships. A similar example would be an automobile 220, with wheels 221, 222, a door 223, and a headlight 224. This recognition is what constellation models attempt to do. Now, even wheels and headlights do have variations, so their detection is not perfect either. Typically multiple hypotheses will have to be entertained; every location has some likeness of being the center of a wheel although for most locations this likeness value is small. Multiple hypothesis for each part leads to a combinatorial search problem for the most likely configuration.

Thus the present application presents a general algorithm for optimizing functions of multiple discrete variables which is applied to the above problem of optimizing the objective function of a constellation model. By using a factorizable upper bound of the objective function, the algorithm of the present application implicitly orders the $N^K$ candidates efficiently by dynamically growing a priority queue. One by one, candidate solutions are retrieved from the priority queue, the true objective function is computed for that candidate, and is then compared to the upper bounds for all the candidates still not extracted from the queue. This can be done efficiently by exploiting the factorizability, as explained below.

When a candidate with a true score that exceeds all the upper bounds of unexplored candidates is identified, this guarantees that the best candidate so far is the optimal solution. We demonstrate that in practice this method is more efficient than alternative optimization schemes by several orders of magnitude, even without recourse to approximations or restricting models.

Many other problems in computer vision and pattern recognition can also be framed as maximization of functions over discrete variables. If there are K variables, each taking one of N values, such maximization becomes a search over $N^K$ possible combinations. The present algorithm may be applied to efficiently find guaranteed optimal solutions for many such problems. The general requirement is that a factorizable upper bound be found on the objective function.

The following discussion now sets forth an optimization algorithm and its application to the location of objects modeled with multiple parts and spatial relations among the parts. It is mentioned here that the optimization algorithm receives part appearances and the distances between the parts (more generally, the spatial configuration of these parts, which may include, in addition or instead of distances, things such as angles, co-linearity relations, etc.). It is to be appreciated that while the following concentrates on constellation models, the to-be-described optimization algorithm is general and can be applied to additional problems with few modifications.

The core optimization algorithm considers an optimization over K discrete variables: $l_1, \ldots, l_2, \ldots, l_K$:

$$l_1^*, l_2^*, \ldots, l_K^* = \arg\max_{l_1 \ldots l_K} f(l_1, \ldots, l_K),$$

where $l_i$ take on discrete values. Each $l_i$ can take on a different set of values. For simplicity, it is assumed that each takes on N values: 0 through N−1. This is called optimization, with the understanding that the objective function $f(\ )$ is defined in such a way that it is $-\infty$ outside the feasible domain. The number of possible solutions is $N^K$.

The function $g(l_1 \ldots l_K)$ is an upperbound on the objective function $f(\ )$ i.e., $\forall(l_1 \ldots l_K) \cdot g(l_1 \ldots l_K) \geqq f(l_1 \ldots l_K)$. Imagine that all $N^K$ possible solutions are arranged in descending order of their upperbound scores in a priority queue. The candidate solution with the highest upperbound (head or head element of the priority queue), is selected and its true score $f(\ )$ is evaluated. If this true score exceeds the upperbound, $g(\ )$, of the next element in the queue then it also exceeds the upperbounds, and true scores, of every unexplored candidate solution. Thus, the optimal solution is found. Otherwise the system keeps track of the best candidate found, and the process is repeated. The best explored solution when the loop ends is guaranteed to be our optimal solution.

Note that order $N^K$ candidates remain in a priority queue, so the system is still burdened by the high computation complexity. This burden can be alleviated if the upper bound is factorizable.

The function $g(l_1 \ldots l_K)$ is a factorizable upper bound of $f(\ )$ if $g(\ )$ can be represented as a sum (or product) of non-interacting parts:

$$g(l_1 \ldots l_K) = \sum_{i=1}^{K} h_i(l_i) \geq f(l_1 \ldots l_K) \tag{1}$$

Then, $$h_i(l_i=a) \geqq h_i(l_i=b) \Rightarrow g(\ldots, l_i=a, \ldots) \geqq g(\ldots, l_i=b, \ldots)$$

The term factorizable is used because the present concepts deal primarily with probability functions that have constituent multiplicative factors. The concepts described herein are still operative if the sum over i is replaced by a product of positive terms.

This leads to our algorithm for dynamically organizing a priority queue sorted by the upper bound, and growing it as necessary. For simplicity, and without loss of generality, assume $h_i(a)$ decreases as a increases from 0 to N−1. (If the assumption does not hold, we sort the candidates at each i by $h_i$, maintaining a sort-index array for inverse mapping. We then use the new ordering of candidates provided by this sorting, and it is guaranteed that in this new ordering the assumption above holds.) Clearly, (0, 0, . . . , 0) is the candidate with the highest upper bound, followed by one of its successors (1, 0, . . . , 0), (0, 1, . . . , 0), . . . , (0, 0, . . . , 1). The set of successor candidates can be obtained by taking the current candidate and incrementing each position index one at a time. Thus we replace the index at each position by the next best possible value. For example, let K=4, and the candidate under consideration be (2, 3, 0, 1)—then the third best option is for the first part, the fourth best option is for the second part, the best option is for the third part, and second best option is for the fourth part. Under this arrangement, the successors for this candidate are (3, 3, 0, 1), (2, 4, 0, 1), (2, 3, 1, 1) and (2, 3, 0, 2). If only these successors are added to the priority queue, we are assured that the candidate with the next highest upper-bound is now in queue—either it was already in the queue and has not been considered yet, or it is one of these four immediate successors. This allows us to grow the queue dynamically, and we do not have to sort all candidates ahead of time. A candidate is always guaranteed to have a higher upper bound than its successors.

The observation leads to the following pseudocode:

```
priorityQ={ };
current= (0,0,...,0);
best=current;
priorityQ.add(successors(current));
while not ( f(best) > g(head(priorityQ)) ) {
    current=head(priorityQ);
    remove_head(priorityQ);
    priorityQ.add(successors(current));
    if not (f(best) > f(current))
        best = current;
}
return best;
```

Thus the priority queue is grown dynamically as the search progresses. When the algorithm returns a solution, it will present an optimal solution. As with most advanced search algorithms, the worst-case complexity of this algorithm is $N^K$, and is in fact, worse than a simple exhaustive search because of the overhead of maintaining a queue, and computing upper-bounds. In practice, however, a large part of the space is never explicitly explored, making the algorithm in this application very efficient. The empirical efficiency depends on the upper bound. The tighter it is for bad solutions, the less is the space actually explored.

There is one more detail to pay attention to. Consider a candidate solution (2, 3, 0, 1) (here K=4.) This has three predecessors: (1, 3, 0, 1), (2, 2, 0, 1), and (2, 3, 0, 0), all of which are guaranteed to have a higher upper bound. If all predecessors are examined then (2, 3, 0, 1) may be added to the queue thrice. A little extra bookkeeping avoids this unnecessary overload. The successor list is computed by incrementing, one position at a time, starting at i=1 and up to the first non-zero position. Thus successor (0, 0, 2, 1)={(1, 0, 2, 1), (0, 1, 2, 1), (0, 0, 3, 1)}. This ensures that each candidate has a unique predecessor, and improves the runtime efficiency of the algorithm. Ideally, a candidate should be entered in the queue only when removing its lowest upper-bound predecessor, but the computational overhead of enforcing this may exceed any potential savings.

As an example application of this iterative algorithm, consider again a constellation model of some object category. For example the category can be human faces, and use parts such as the eyes, nose, and mouth. In general, there will be K parts with characteristic appearance. The geometric configuration of these parts is represented by a vector $L=[l_1, \ldots, l_K]$, where $l_i=(x_i, y_i)$ is the location of part i.

Given an image I, the locations vector L may be determined to describe the configuration of parts in I. To do this, the system maximizes p(L|I), the probability of the part configuration L in the image. This can be expressed as:

$$p(L|I) \propto p(L)p(I|L). \tag{2}$$

The first term, p(L), is called the 'spatial prior'. The second term (called 'appearance term') is often modeled as:

$$p(I \mid L) = \prod_i p(I[l_i] \mid l_i, A_i) \tag{3}$$

Here $I[l_i]$ is the representation of appearance of an image patch centered at $l_i$ in image I. This can be the raw pixel values extracted from that location, or some other representation of the appearance, such as that given by a scale-invariant feature transform (SIFT) descriptor. $A_i$ is the set of model parameters that encode the appearance of the i*th part. For example, if $I[l_i]$ is the SIFT descriptor of the image patch, then $A_i$ can be the mean and covariance of the training descriptors.

This factorization assumes that the appearance of each part given its location in an image is independent of locations and appearances of all other parts. This assumption does not always strictly hold. For example, the appearance of facial features is affected by the person's gender, so a feminine appearance of one part does affect the probability that another part appears masculine. The assumption is also violated when the parts overlap (although many spatial priors exclude such configurations from consideration anyway). But in general, this approximation is widely used in practice and can give useful results as shown in D. Crandall, P. Felzenszwalb, and D. Huttenlocher, "Spatial priors for part-based recognition using statistical models", *CVPR,* 2005, and T. K. Leung, M. C. Burl, and P. Perona, "Finding faces in cluttered scenes using random labeled graph matching", *ICCV,* 1995, both hereby incorporated by reference in their entireties.

The complete model thus becomes:

$$p(L \mid I) \alpha \; p(L) \prod_i p(I[l_i] \mid l_i A_i) \tag{4}$$

Again, the task of localization is to find the part configuration $L=[l_1, \ldots, l_K]$ which maximizes this expression.

The optimization of constellation models described above lends itself easily to the algorithmic requirements of the present application wherein the objective function is (in logarithmic form):

$$f(l_1 \ldots l_K) = \log p(l_1 \ldots l_K) + \Sigma_i \log p(I[l_i]l_i, A_i)$$

A natural factorization is:

$$h_i(l_i) = \log p(I[l_i]l_i, A_i)$$

Note that $0 \geqq \log p(l_1 \ldots l_K)$; therefore, the upper bound is given by the appearance model, and the complete score or true score is obtained by adding the logarithm of the spatial prior to it.

Under this formulation, the algorithm has a nice intuitive explanation. The search is ordered according to local responses to part models. The best responses to each part in an image comprise the hypothesis that is tested first, considering weaker fits as stronger hypotheses get rejected on combining the spatial prior. The constellation model is probabilistic, but the algorithm is equally applicable to similar models based on energy functions rather than probabilities.

Figure 3:
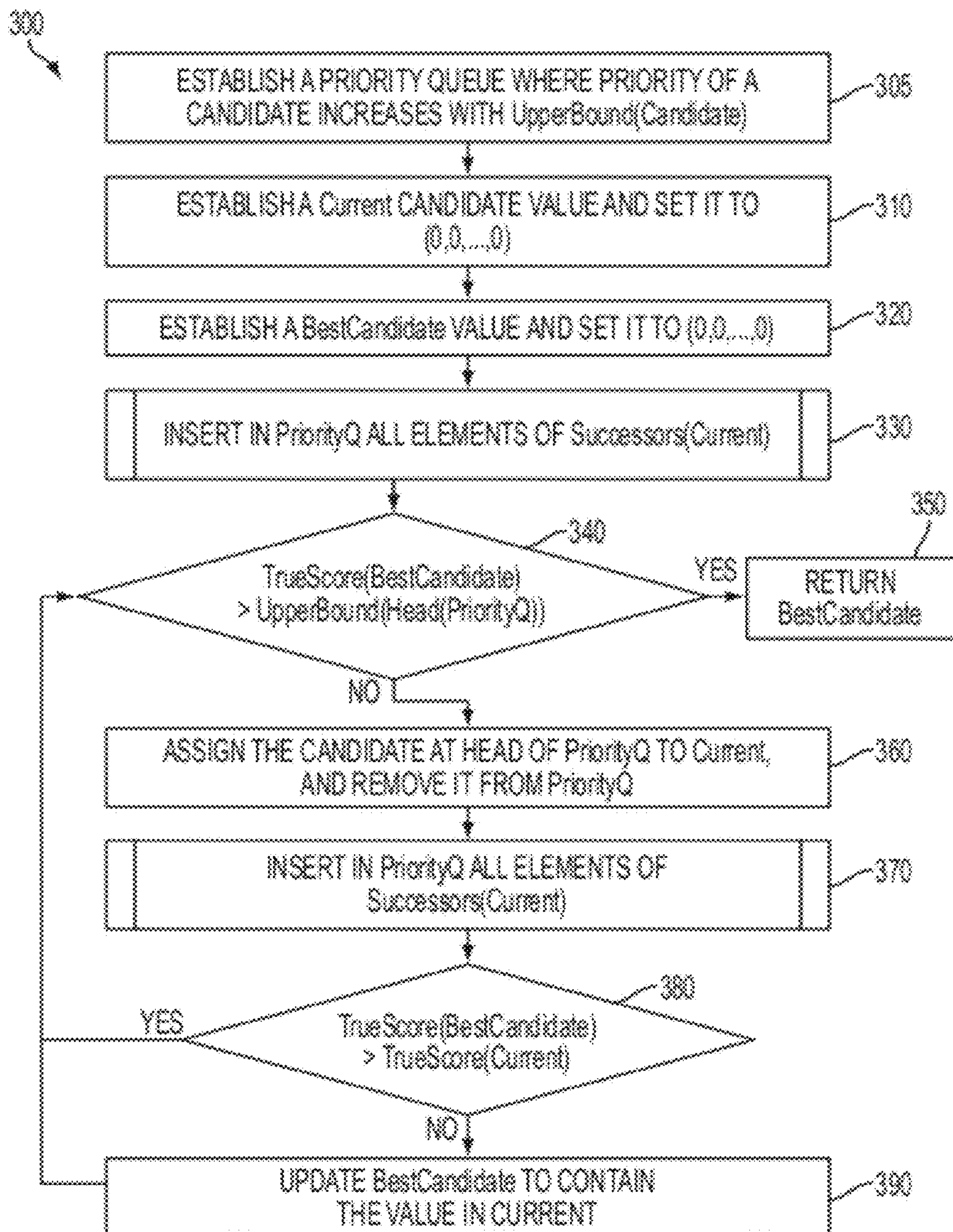
FIG. 3 is a flow diagram for a process according to the present application.

Turning to FIG. 3 presented is a flow diagram 300 of the optimization algorithm described above, and reflecting the operations of the previously disclosed pseudocode. The steps demonstrate how to apply the algorithm to locate objects modeled with multiple parts and identify spatial relations among the objects.

Flow diagram 300 of FIG. 3 establishes a priority queue (PriorityQ), where the priority of a candidate increases with UpperBound(candidate) 305. The UpperBound( )function is the same as the previously described g( ) and is computed as in Equation 1. The process also establishes a Current candidate value, which is set to (0, 0, . . . , 0) 310, and a BestCandidate value which is set to (0, 0, . . . 0) 320. Then the process inserts in PriorityQ all elements of Successors(Current) 330. The successors of any candidate are computed as previously explained.

At this point an iterative loop begins with a test to determine if TrueScore(BestCandidate)>UpperBound(Head(PriorityQ)) 340. The TrueScore( ) function is the same as $f( )$ in our notation. If the test in step 340 succeeds (YES), the process returns BestCandidate 350. If however, the test in step 340 fails (NO), the process assigns the candidate at the head of priorityQ to Current, and removes it from priorityQ 360. Next, the iterative loop of the process inserts in priorityQ all elements of Successors(Current) 370, and thereafter moves to another test to determine if TrueScore(BestCandidate)> TrueScore(Current) 380. If the test in step 380 succeeds (YES) the process returns to step 340 and continues. If the test in step 380 fails (NO) the process updates BestCandidate to contain the value in current 390 and then returns the process to step 340, for further processing.

Figure 4:
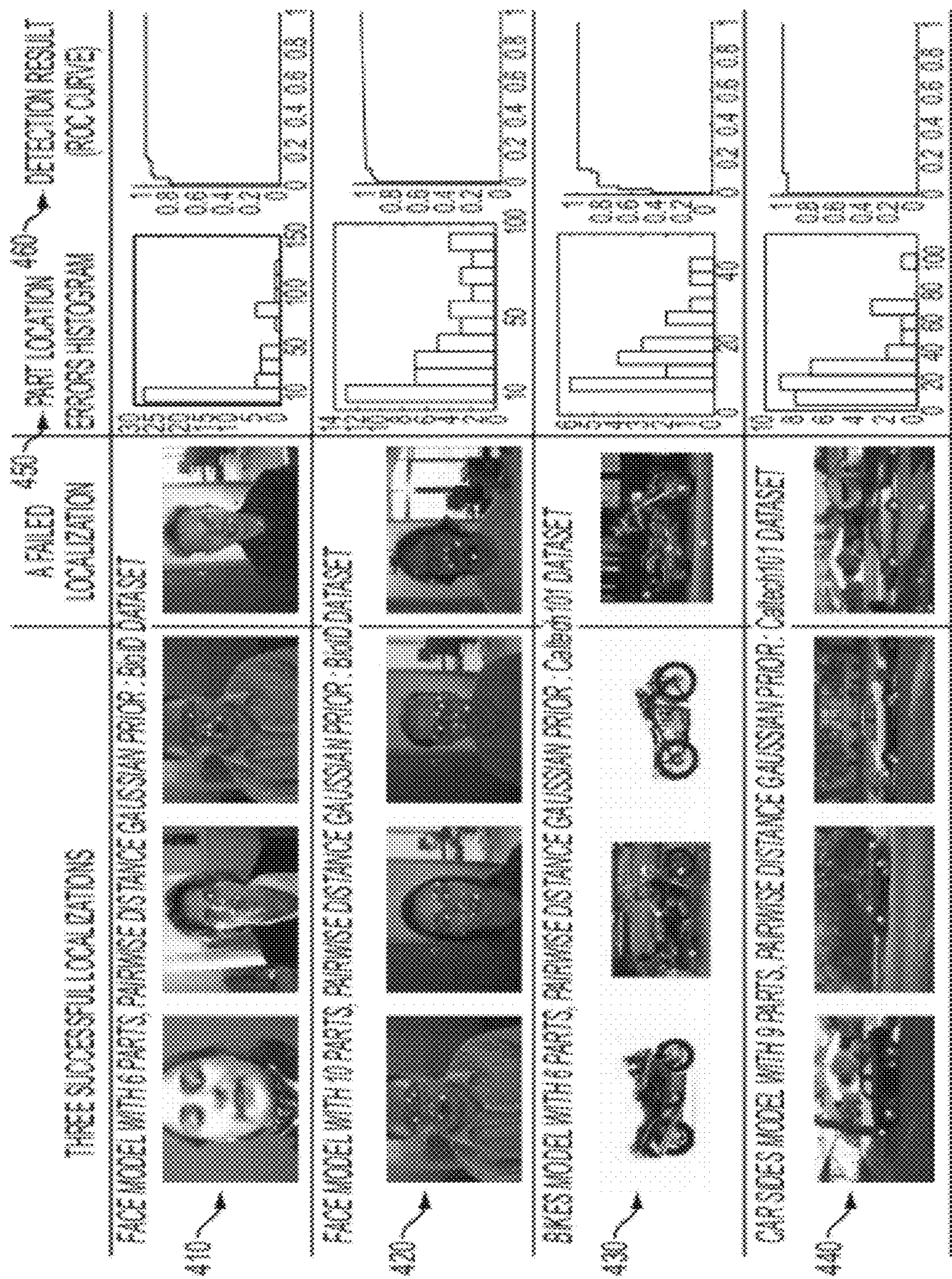
FIG. 4 is an overview of localization.

FIG. 4 presents a series of test results which demonstrate applying the proposed algorithm to find optimal configurations (i.e., part locations) of four constellation models (two face models, a motorbike model and a car model). One can train model parameters through supervised learning on images (i.e., image templates) that are manually annotated with category labels and part locations. Alternative methods to learn such models automatically are readily available as discussed, for example in Fergus et al, "Object Class Recognition by Unsupervised Scale-Invariant Learning", in *CVPR*, June 2003; Weber et al., "Towards Automatic Discovery of Object Categories", in *CVPR*, pages 101-109, 2000; and Weber et al., "Unsupervised Learning of Models for Recognition", in *ECCV*, pages 18-32, 2000, each incorporated herein in their entirety.

With attention to the setting up of constellation models, as described earlier a constellation model is composed of two factors, a parts appearance model, and a spatial relations model. Different kinds of appearance models and spatial priors are trained, which mix and match to get several constellation models. The present algorithm is evaluated with these models. In doing so it is noted that that no change had to be made to search algorithm pseudocode (see also FIG. 3 flowchart) according to the kind of model used. In fact the advantage is that the search will give the optimal solution, so if performance is bad, it would be the model that needs to be changed.

Three appearance models are used within the testing described herein. In one, appearance at each image location is represented by a scale-invariant feature transform (SIFT) descriptor (such as discussed in Lowe, "Distinctive Image Features From Scale-Invariant Keypoints", in *IJCV*, 60(2):91-110, 2004), hereby incorporated in its entirety by reference. in a 41×41 pixels neighborhood around the location. Each part's likelihood $p(I[l_i]l_i, A_i)$ is modeled as a Gaussian distribution with parameters, $\mu_i$, $\Sigma_i$, estimated from the images used for training the model.

In another appearance model, the appearance of an image location is given by the raw pixel values in the 41×41 pixels neighborhood. The part $A_i$ is a neighborhood patch around a marked part location, and the appearance score $p(I[l_i]l_i, A_i)$ is computed as the normalized cross-correlation—$NCC(A_i, I[l_i])$. In this formulation, $p(I[l_i]l_i, A_i)$ is not a proper probability distribution, and the notation $h(I[l_i]l_i, A_i)$ is more appropriate. Nevertheless the optimization algorithm remains the same, because it is applicable to arbitrary functions, not just probability distributions.

In a third appearance model, the appearance at an image location is encoded as the responses of 90 different Haar filters within a 41×41 pixel neighborhood. The appearance score $h(I[l_i]l_i, A_i)$ is computed as the response of an Adaboost classifier trained to tell appearances of true part locations from random image locations. For the Haar-Adaboost model uniform grid-points all over the image are used as candidate part locations (N>1000 locations in almost every image), whereas Harris-Laplace interest points (as discussed in Mikolajczyk et al., "A comparison of Affine Region Detectors", in *IJCV*, 65(½):43-72, and hereby incorporated in its entirety herein by reference) are treated as candidate locations in the first two (N>100).

Note that although 41×41 pixel neighborhoods were used in the experiments described above, this is not a requirement of the model and arbitrarily sized neighborhoods (including non-square and non-rectangular neighborhoods) can be used instead.

Additional experimentation was undertaken for different spatial priors. One spatial prior p(L) was modeled using pairwise distances between the parts. For K parts, there are $$\frac{K(K-1)}{2}$$

such distances. Denoting the distance between locations $l_i$ and $l_j$ by $d_{i,j}$, and by D the vector of all distances $[d_{1,2}, \ldots, d_{K-1,K}]$, we define p(L) in this model as proportional to p(D(L)). In the experiments, p(D(L)) was a Gaussian distribution with a diagonal covariance matrix. The parameters of this distribution were learned from the training examples.

Another spatial prior was similar to the one above, except that all distances were scaled by the distance between $l_1$ and $l_2$. The objective is to achieve scale invariance.

A third type of spatial prior addresses face images only and is called the symmetry prior. This penalizes left and right part locations for not being mirrors of each other about the face axis. It is included here as an illustration that our spatial priors can be made arbitrarily complex, and they do not need to be factorizable in any way.

As part of the experiments, three datasets as shown in FIG. 4, were used: face datasets 410, 420, a motorcycle dataset 430, and a car dataset 440. The BioID dataset of face (410, 420) images consists of 1521 face images of 23 subjects, as discussed in Jesorsky et al., "Robust Face Detection Using the Hausdorff Distance", in *Audio and Video Based Person Authentication,* 2001, which is hereby incorporated by reference herein in its entirety. Each image is fully annotated with part names and locations. There are significant variations of facial expression and illumination. The original images also have scale variations, so all images have been rescaled so that the faces had roughly the same size.

In addition, motorbikes and car side views from the Caltech 101 dataset have been tested, where the Caltech 101 dataset is discussed in Fei-Fei et al., "Learning Generative Visual Models From Few Training Examples: An Incremental Bayesian Approach Tested on 101 Object Categories", in *CVPR* 2004 *Workshop on Generative-Model Based Vision,* 2004, which is incorporated herein by reference in its entirety. Again, the images in each category were rescaled so that the objects of interest had roughly the same size across all images. Approximately 100 images have been used for training the BioID face models, and 30 training images for each of Caltech motorbikes and cars.

To establish that "reasonable" models are being used qualitative performance measures are provided on two target problems: object detection and object localization. These tasks are defined in paragraph.

For the first task, performance is measured using receiver operating characteristics (ROC) curves. For each category, the best match score for the constellation model is found using our algorithm. This is done for each test image within the corresponding category, and in addition on the 'background' images (50 images from the Caltech101 'background' set). The 'background' images are used as negative exemplars. From here, the ROC plots are computed by varying the acceptance threshold.

Receiver operating characteristics (ROC) or simply ROC curve, is a concept in signal detection theory for a graphical plot of the sensitivity vs. (1-specificity) for a binary classifier system as its discrimination threshold is varied. The ROC can also be represented equivalently by plotting the fraction of true positives (TPR=true positive rate) vs. the fraction of false positives (FPR=false positive rate). Also known as a Relative Operating Characteristic curve, because it is a comparison of two operating characteristics (TPR & FPR) as the criterion changes. ROC analysis provides tools to select possibly optimal models and to discard suboptimal ones independently from (and prior to specifying) the cost context or the class distribution.

The second task is part localization. Here the best locations for model parts are identified as those corresponding to the optimal model configuration found by our algorithm. These locations are recorded for all in-category test images and then compared to manually annotated "ground truth" locations for evaluation purposes. As an example, the mean Euclidean distance between the inferred locations and manually annotated "ground truth" locations can be computed to quantify the part localization accuracy.

Some experimental results are presented in FIG. 4. We plot histograms of localization errors 450 for several models. We also present the ROC curves 460 demonstrating detection performance.

Figure 5:
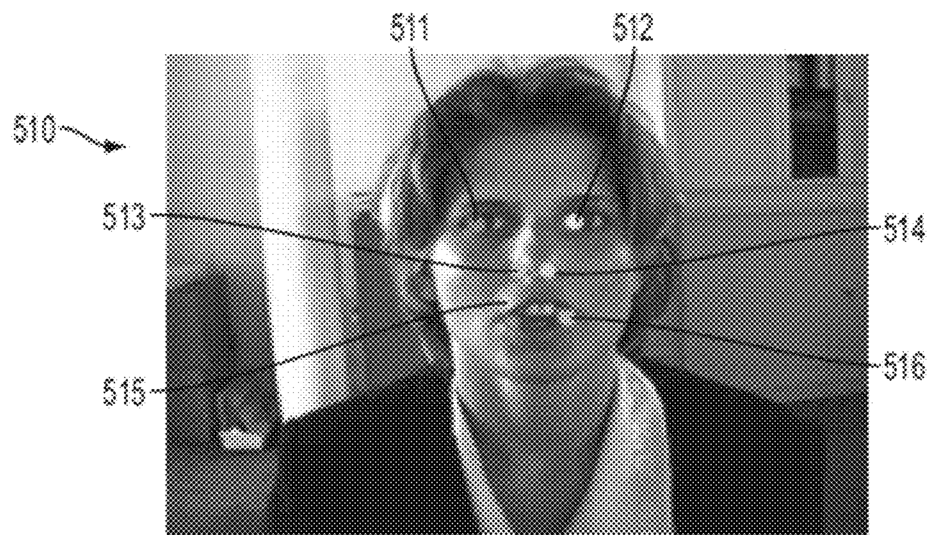
FIG. 5 is a detail of face recognition.
Figure 5:
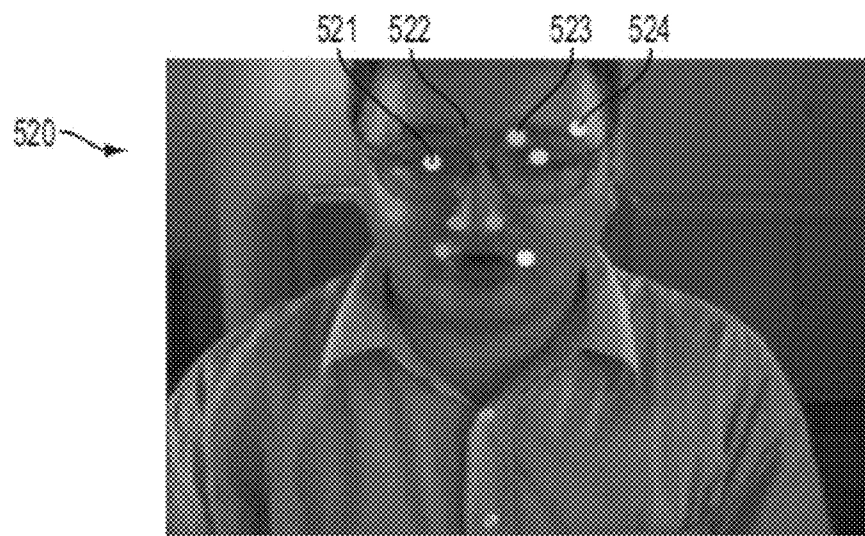

FIG. 5 details the results of experiments with the BioID face dataset 500, building models with 6, 10, and 14 parts respectively. For the six part models 510, pupils of the eyes 511, 512, the two nostrils 513, 514, and the left 515 and right 516 mouth corners are used. For the ten part models 520 the four endpoints 521, 522, 523, 524 of the eyebrows are added. The system may use four eye corners in 14-part models.

Figure 6:
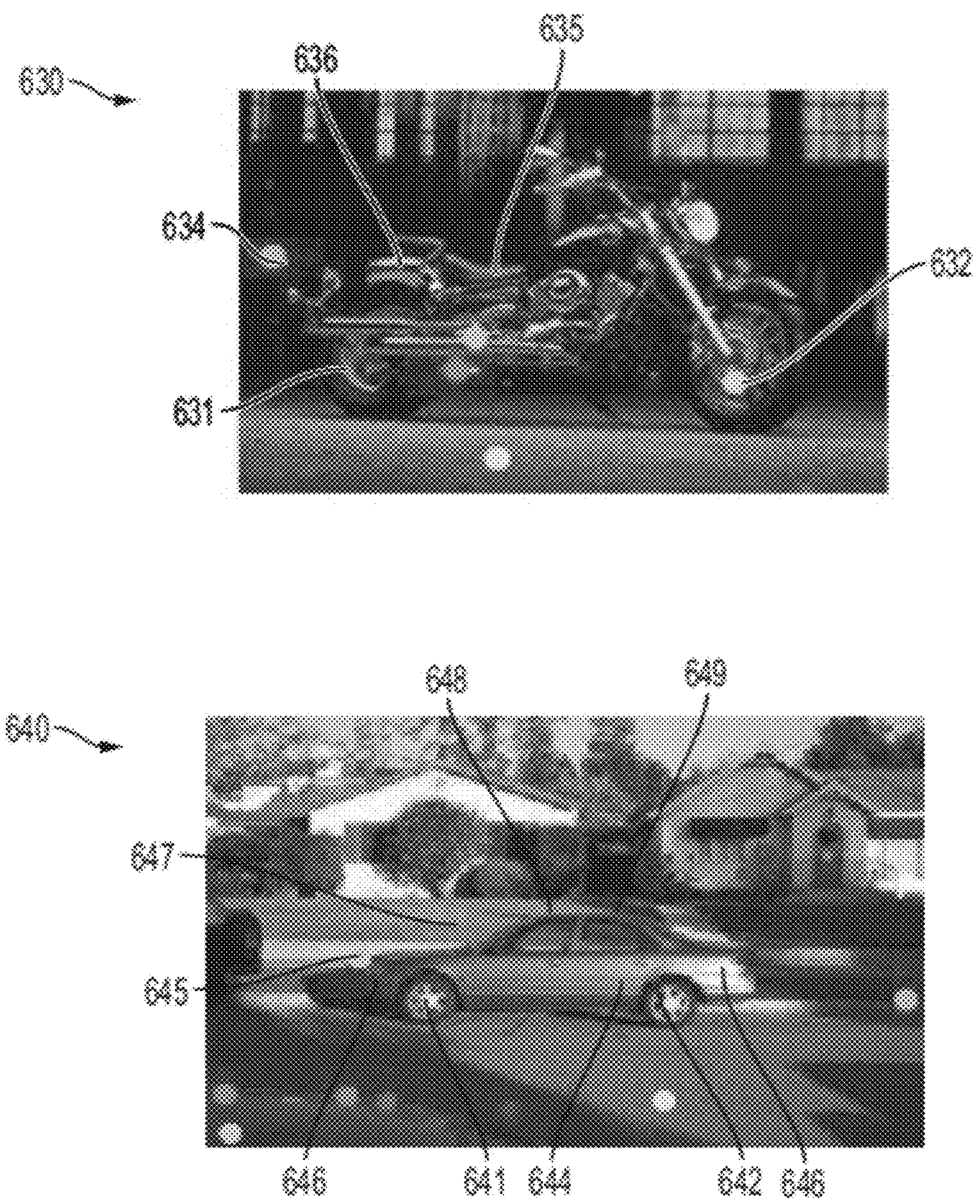
FIG. 6 is a detail of vehicle recognition.

FIG. 6 presents the results of using a dataset of motorbikes 630, using six parts: the centers of the two wheels 631, 632, the front and tail lights 634, and the front 635 and back 636 of the seat.

The result of using a cars dataset 640 is presented which uses nine parts: centers of the two wheels 641, 642, inner corners of the tire guards 643, 644, front 645 and tail 646 lights, the lowest point of the windshield profile 647, and the two extremities of the roof 648, 649.

These examples demonstrate how parts are localized quite accurately despite changes in appearance and geometry of individual objects within each category.

Figure 7:
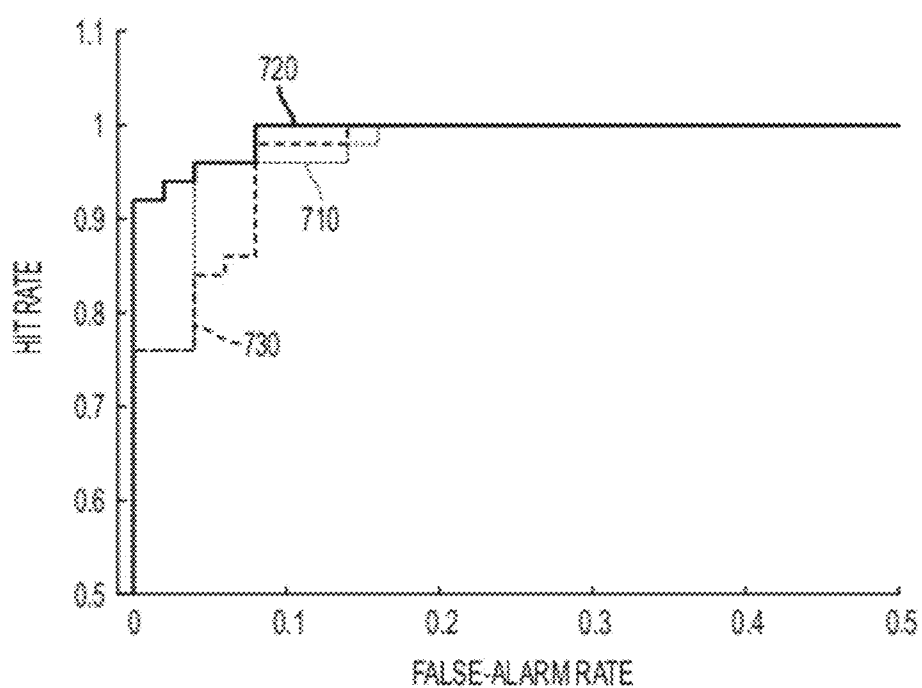
FIG. 7 illustrates improved performance based on number of parts used.

FIG. 7 demonstrates the face detection performance of three face models with 6 parts 700; 10 parts 730; and 14 parts 720; respectively. All models are trained and tested on images from the BioID dataset, and use pairwise distance Gaussian priors. The ROC curves plot false-alarm rate (X axis) vs. hit rate (Y axis).

Figure 8:
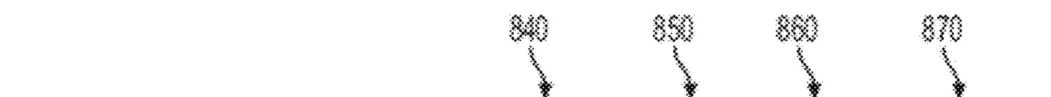
FIG. 8 illustrates the speed improvements obtained by use of the present concepts.

FIG. 8 presents an optimal solution based on 6 parts (810), 10 parts (820), and 14 parts (830). The main results—the efficiency of the proposed search algorithm while guaranteeing optimality. The average number of configurations that the present algorithm 840 explores is compared to the number of configurations that a star-model 850, 2-fan model 860, and exhaustive search 870 would explore. Note that the algorithm 840 is empirically more efficient than even 2-fan, even though 2-fan requires a more restrictive model. The results are organized by the model used and the test data set.

For each of the learned models, the average number of iterations taken by the algorithm to find the global optimum is shown. Each iteration corresponds to evaluating one configuration of parts. For comparison, the number of evaluations that a star model 850 and a 2-fan model 860 would perform is presented. Note that the star 850 and 2-fan 860 models search over a restricted space; therefore, their representational power is weaker compared to a constellation model with full spatial prior. The optimal configuration according to the 2-fan model would not necessarily be optimal according to the full constellation model. In contrast, the proposed optimization algorithm is guaranteed to find the global optimum for the full constellation model.

Also listed is the number of all possible configurations, although it is known that this number is infeasible in practice for more than three or four parts. As can be seen, the present algorithm/pseudocode (see also the flowchart of FIG. 3) makes fewer evaluations than a 2-fan model would, although the latter is a more restrictive model. This allows one to model the probability distribution p(L|I) more accurately while also improving computational efficiency.

Figure 9:
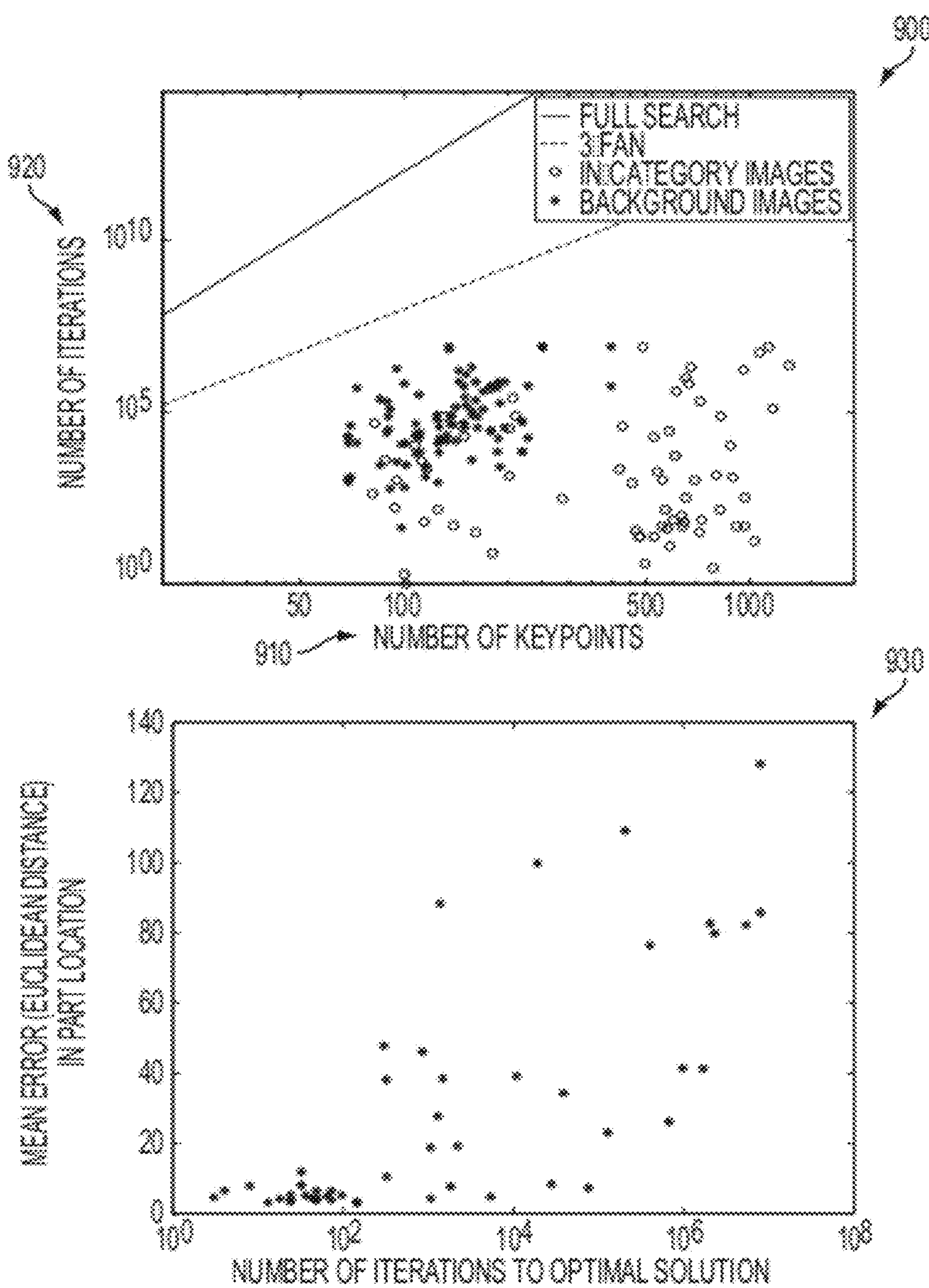
FIG. 9 illustrates effect of multiple iterations.

FIG. 9 demonstrates how the number of iterations depends on the number of candidate part locations in the image. Scatter plot 900 of the number of iterations (configurations explored) by our algorithm as a function of the number of candidate part locations (e.g., keypoints), on the X axis 910; the number of candidate part locations on the Y axis 920, the logarithm O regarding the number of iterations for 3-fan, and the full search with six parts are also plotted 930. The number of configuration explored by our algorithm in the worst cases is orders of magnitude better than full search and 3-fans. Studying the scatter plot provides a few insights into the algorithm. When the image contains an object of the model's category, the algorithm often terminates after very few iterations. These reflect situations when the part appearance models have scored the right candidates highly. When the image belongs to the background category, part models match at spurious locations, and there are few clear winners. Therefore many more configurations need to be explored before declaring the winning configuration.

Of course, in practice background images would be rejected quickly by terminating the search once the upper bound falls below the acceptance threshold. Finally, there are also several cases where for "in-category" images the search runs for a million or more iterations. Usually in these situations the optimal solution is found very early, but the algorithm must examine many alternatives before it can confirm that it is indeed the optimum. If the optimum configuration is correct, this implies that the spatial prior model is penalizing correct configurations too much. If the optimum configuration is wrong, it often points to problems with the appearance model. This pattern suggests that, for constellation models, our algorithm may be useful in analyzing and debugging model objective functions.

Enabled by the computational efficiency of our algorithm, a natural exploit is to increase the number of parts in the constellation model. The largest constellation models applied, in literature, consists of seven parts. We have applied constellation models with 10 and 14 parts (on the BioID dataset).

Alternative spatial priors in most prior work have been modeled by Gaussian distributions. This allowed several optimizations of the search process. For example, the convenient functional form of the Gaussian distribution was used to reduce the search time from $N^{k+1}$ $N^k$ evaluations. The properties of the distribution are also used to speed-up the priority queue search.

The algorithm of the present application places no constraints on the spatial prior such as convexity or even continuity. To illustrate the versatility of the present method, it is applied here to a model where the spatial relations of face parts are modeled using symmetry. For each part from the right-hand side of the face, the corresponding part from the left-hand side is also included in the model. The symmetry prior is computed in the following way. First since all part locations (rather than a partial solution) occur in each iteration, the best face axis—the line joining the midpoints between eyes and lip-corners is computed. Then for each line segment joining each part-pair (e.g., left nostril, right nostril) a penalty is accumulated if the face axis does not bisect it perpendicularly.

The algorithm is able to efficiently optimize the new constellation model. The algorithm can successfully optimize the model even though the prior distribution doesn't have an easy analytical form.

The method performs efficient optimization of category models with spatial relations among parts. The method was applied to the well-known family of constellation models, and was shown to improve the computational efficiency of these models by several orders of magnitude. It also demonstrates that this speedup is useful in practice, as it allows improved categorization performance by using models with more parts.

The present algorithm performs a search somewhat related to concepts of A* search with an admissible heuristic. However, in typical A* search a search-node represents a partial solution (the entire set of the descendant leaf nodes.) Therefore, the heuristic function to be computed at each node has to be an upper bound on all descendant solutions, requiring a whole hierarchy of bounding functions to be available. In the present algorithm, at each iteration a solution (leaf) node is considered. The objective function can thus be arbitrarily complex, and all that is required is one factorizable upper bound. In the constellation localization experiments, this "iterative algorithm" of the present application works unchanged with various complex spatial priors. Whereas search considerations tend to limit the models that are considered in literature, this is a significant advantage of the algorithm.

The algorithm is an anytime algorithm. It can be interrupted at any time during its execution to obtain the best available complete solution at that time, rather than a partial solution.

The proposed algorithm can be used to improve the search efficiency in k-fan models as well. The algorithm would be used to schedule evaluations of configurations of the k anchor parts. For a given configuration of these k anchor parts, the 'true score' will be the total model score that includes the k anchor parts, as well as the optimal arrangement of the other parts.

The concepts described herein offer the benefit of improving speed of optimization by several orders of magnitude. This makes localization significantly more efficient, so that the method can potentially be applied to some realistic tasks. Furthermore, due to speed improvement, more object parts can be modeled. As a result, the localization and categorization performance increases.

For image categorization we can use one of several well known techniques for multiple class classification based on individual category models. We find the optimal match for several category models using our algorithm. The category with the highest match score is assigned as the category of the image. Of course, we do not have to pick just one category. We could accept as valid category labels all categories that pass a detection test on the image. Many other methods can be used where the various category scores are normalized before resolving the assigned category or categories.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of interpreting an image comprising:

finding a configuration of multiple variables which optimizes an objective function with a factorizable upper bound, wherein factorizable means that the upper bound is, or can be manipulated into the form of a sum of non-interacting parts or a product of non-negative interacting parts by:

applying an iterative algorithm that relies on efficient dynamic ordering of elements known as candidates, in a priority queue, in a descending order of an upper bound score, wherein the iterative algorithm includes:

a. establishing a priority queue, wherein priority of a candidate increases with an UpperBound(candidate);

b. establishing a current candidate value and set the current candidate value to (0,0 . . . , 0);

c. establishing a bestCandidate value and set the bestCandidate value to (0,0 . . . , 0);

d. inserting in the priority queue all elements of a successors(current), wherein a successors function is defined such that applying the successors function to an initial element value (0,0, . . . ,0), to obtain its successors, then applying the successors function again to the successors of this element, then to successors of those successors, for a plurality of repetitions, will produce all relevant tuples;

e. making an inquiry as to whether the bestCandidate value represents a satisfactory solution, if step e returns "true" then return the bestCandidate value;

if step e returns "false" then (i) assign the candidate at the head of the priority queue to the current candidate value, and remove the candidate at the head of the priority queue from the priority queue, (ii) insert in the priority queue all elements of successors(current), and thereafter (iii) determine if TrueScore(bestCandidate>TrueScore (current), wherein TrueScore is an actual value of the objective function, then if step e (iii) returns "true" return to start of step e; and if step e (iii) returns "not true" update the bestCandidate value to contain the value in the current candidate value, and return to the start of step e, wherein the method is performed by a system using at least one processor.

2. The method according to claim 1 wherein the iterative algorithm is an anytime algorithm which may be interrupted during execution to obtain the best available complete solution so far.

3. The method according to claim 1 wherein the iterative algorithm is terminated before completion based on a suitable criterion, including but not limited to comparison of a current score and highest upper bound to a threshold.

4. The method according to claim 1 wherein the objective function includes a first term and a second term, the first term describing properties of individual parts of objects or scenes, and the second term describing relations and/or constraints among these parts.

5. The method according to claim 4 wherein the upper bound on the objective function is derived from the first term.

6. The method according to claim 4 wherein the first term of the objective function specifically describes an appearance model of an individual part of the objects or scenes.

7. The method according to claim 4 wherein the second term of the objective function describes a spatial relations model among the parts of the objects or scenes.

8. The method according to claim 1 wherein the objective function is given by a constellation model.

9. The method of claim 6, wherein the appearance model employs a SIFT descriptor.

10. The method of claim 6, wherein the appearance model for each part employs one or more image templates.

11. The method of claim 6, wherein the appearance model for each part employs one or more Haar filter responses.

12. The method of claim 7, wherein the spatial relations model comprises pairwise distances between parts.

13. The method according to claim 12 wherein image interpretation is invoked to determine at least one of location, scale or pose of complete objects in the image without a further goal of obtaining information based on the one of location, scale or pose.

14. The method according to claim 12 wherein image interpretation is invoked to determine at least one of location, scale or pose of object parts in the image with or without a further goal of obtaining information based on the one of location, scale or pose.

15. A method of interpreting an image comprising:

finding a configuration of multiple variables which optimizes an objective function with a factorizable upper bound, wherein the objective function includes a first term and a second term, the first term describing properties of individual parts of objects or scenes, and the second term describing relations and/or constraints among the parts, and describing a spatial relations model of an individual part of the objects or scenes, and wherein the spatial relations model comprise pairwise distances between the parts, and wherein factorizable means that the upper bound is, or can be manipulated into the form of a sum of non-interacting parts or a product of a non-negative interacting parts by:

applying an iterative algorithm that relies on efficient dynamic ordering of elements known as candidates, in a priority queue, in a descending order of an upper bound score, and invoking image interpretation for the purpose of determining whether or not an object of a given category, or a part of such an object, is present in an image, wherein the method is performed by a system using at least one processor.

16. The method according to claim 12 wherein the iterative algorithm is used to optimize each of multiple objective functions in order to pick the best interpretation that can be assigned to an image.

17. The method of claim 1, wherein the upperbound is factorizable if the upperbound can be represented as a sum or product of non-interacting parts.

18. The method of claim 1, wherein successors of a candidate tuple are computed by incrementing, for one position at a time, a value at that position, when possible by one.

19. The method of claim 1, where successors of a candidate tuple are computed by incrementing, for one position at a time, a value at that position, when possible, by one, up to and including a first non-zero position.

20. The method of claim 1, where an inquiry as to whether the bestCandidate represents a satisfactory solution is performed by checking whether the following condition is true:

TrueScore(bestCandidate)>UpperBound(head(priority)).

* * * * *